J. W. DROLL.
MATTRESS ROLL FORMING MACHINE.
APPLICATION FILED JAN. 25, 1918.

1,300,140.

Patented Apr. 8, 1919.
9 SHEETS—SHEET 2.

INVENTOR.
Joseph W. Droll
BY
Arthur L. Slee
ATTORNEY

Fig. 9.

UNITED STATES PATENT OFFICE.

JOSEPH W. DROLL, OF OAKLAND, CALIFORNIA.

MATTRESS-ROLL-FORMING MACHINE.

1,300,140. Specification of Letters Patent. Patented Apr. 8, 1919.

Application filed January 25, 1918. Serial No. 215,010.

*To all whom it may concern:*

Be it known that I, JOSEPH W. DROLL, a citizen of the United States, residing in the city of Oakland, county of Alameda, and State of California, have invented a new and useful Improvement in Mattress-Roll-Forming Machines, of which the following is a specification.

The present invention relates to improvements in mattress roll forming machines wherein a pair of parallel needles operate in conjunction with sewing means to pack stuffing into a corner of a mattress to form and permanently secure a roll on the edges thereof.

In the manufacture of mattresses and the like it is conceded that the formation of a roll around the edges of the mattress tends to prevent said edges from breaking down and also to retain the shape of the mattress. To accomplish this feature it is necessary that the roll shall be hard and uniformly packed.

It is the practice to pack a portion of the mattress stuffing adjacent the corners and edges thereof to form a roll by means of packing needles operated manually which, however skilful the operator, does not always provide an evenly formed and a hard uniformly packed roll.

The present state of the art discloses means whereby a packing needle enters one side of a mattress at right angles thereto and after changing its course packs a comparatively small portion of stuffing into a square corner. Experiment has disclosed that this form of a device does not engage and pack sufficient mattress stuffing to form a sufficiently hard roll and as the pivotal point of the needle must necessarily be some distance from the mattress said ticking is gathered toward the edge of the mattress which when released by the needle, in spreading out after being sewed, forms a pocket greatly too large for the amount of stuffing gathered by the needle.

A further disadvantage in this form of machine is that in withdrawing the needle the operation is reversed which causes the needle to bring away from the packing a portion of the stuffing previously packed therein thereby reducing the hardness and firmness of the roll.

The present invention has for its object the provision of a pair of packing needles to enter the top and the side of a mattress adjacent one edge and to include in their movement a greater arc than heretofore accomplished thereby engaging and packing into the edge a sufficient quantity of stuffing to form a hard, compact roll.

A sewing means is provided to permanently secure the roll as soon as formed by the packing needles, and the packing needles are withdrawn along the line of their longitudinal axes so as to prevent disturbance or withdrawal of the packed stuffing.

The entire machine is moved equal spaces at regular intervals to provide a uniform stitching which, with the uniformly packed and formed roll, will present a more regular and therefore a neater appearance than work done by hand, as well as forming a greater number of rolls within a given time.

Another object of the present invention is to provide improved means for causing the roll forming mechanism to assume various angles relatively to the edge of the mattress whereby the roll may be formed above or below the edge of the mattress thereby giving an appearance of thickness to the mattress.

I accomplish these several objects by means of the improved form of device disclosed in the drawings forming a part of the present specification wherein like characters of reference are used to designate similar parts throughout the said specification and drawings, and in which—

Referring to the drawings the numeral 1 is used to designate a portion of the top of what is known in the art as a mattress table on which mattresses are usually placed while being tufted and rolled.

The table 1 is provided with guide plates 2 near the edges thereto to regulate the position of the mattress to be operated upon relatively to the mechanism.

The table 1 is also provided with a stringer 3 having inset electrical conductors 101 in the outer face and having a supporting track 6, hereinafter described more in detail, secured to the lower outer surface thereof.

A second stringer 7 is provided which acts as a fulcrum to a wheel 8 rotatably mounted upon the end of an arm 9 secured to a frame 10 having wheels 11 mounted on casters 12 which ride in the track 6 on the stringer 2 and thereby slidably or movably support the frame 10 so that said frame may traverse the edges of the table 1 in a manner hereinafter more fully described.

The frame 10 is also provided with upper and lower lateral guiding rollers 14 and 15 to keep the machine up to the working line as represented by the edges of the mattress.

The frame 10 is also provided with a hollow standard 16 within which is slidably mounted an extension 17 the lower end of which extends below the frame 10 and is engaged by a threaded nut 18 to raise and lower the said extension 17 to adjust the machine to mattresses of various thicknesses. A spring 19 normally raises the extension 17 to its extreme height and the nut 18 pulls the extension 17 downward against the tension of the spring 19 to lower same and when the nut 18 is turned to release the extension 17 the said spring 19 raises said extension.

A second extension 21 is pivotally mounted as at 22 to the upper end of the extension 17 and carries a shaft 24 having mounted thereon a shuttle cam 26, and a cam 27 whose edge 28 engages a roller 29 mounted upon the lower end of a square rod 31 slidably mounted within the frame 21 to carry a pair of arms 32 pivotally mounted upon the upper end thereof.

Figure 7:
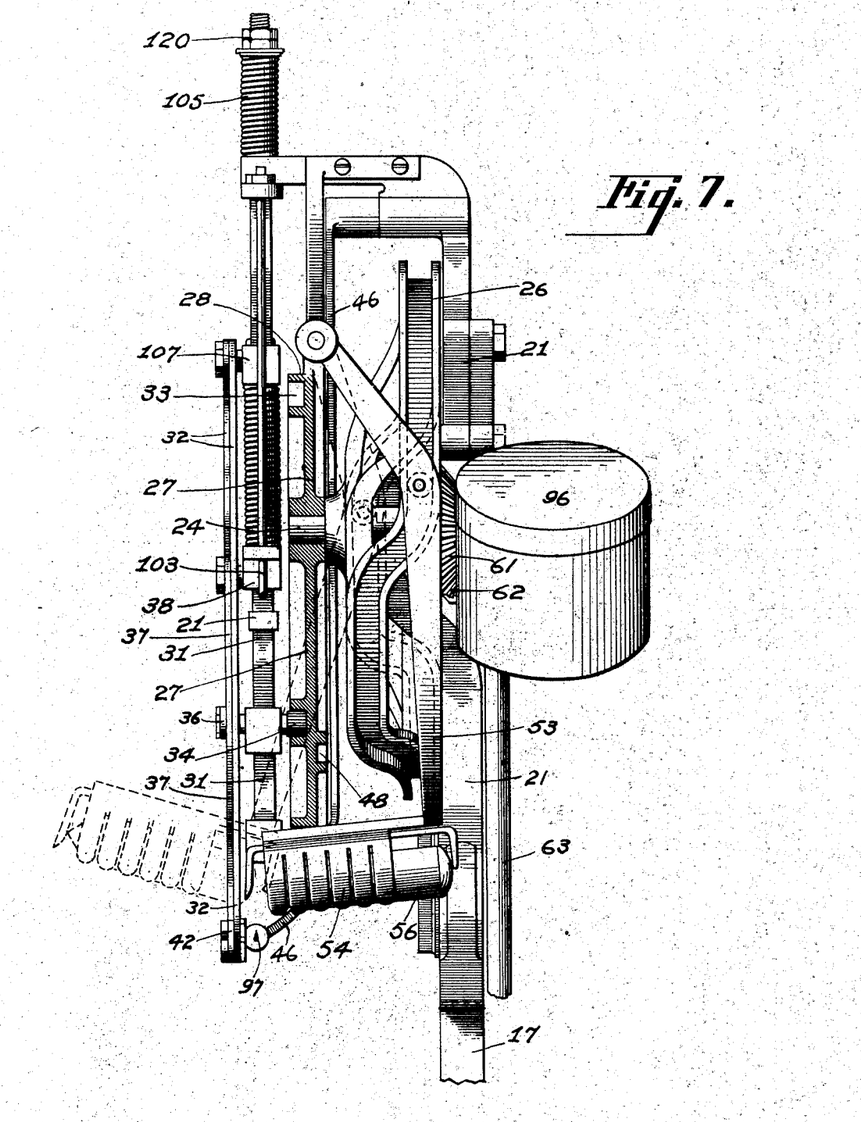
Fig. 7 is a broken side elevation, partly in section of Fig. 6.

The cam 27 is also provided with a groove 33 which engages a roller 34 mounted on the pivotally connected ends of a pair of links 36 whose opposite ends are pivotally connected to a second pair of arms or levers 37 in turn pivotally mounted at their upper ends to a sleeve 38 slidably mounted upon the square shaft or rod 31 as disclosed in Fig. 7 of the drawings.

The lower ends of the arms 37 have pivotally mounted upon the lower ends thereof a pair of packing needles 41 having extensions 42 whose ends are pivotally connected to the lower ends of the first set of arms 32, the purpose of which will hereinafter be more fully described.

Figures 2, 10:
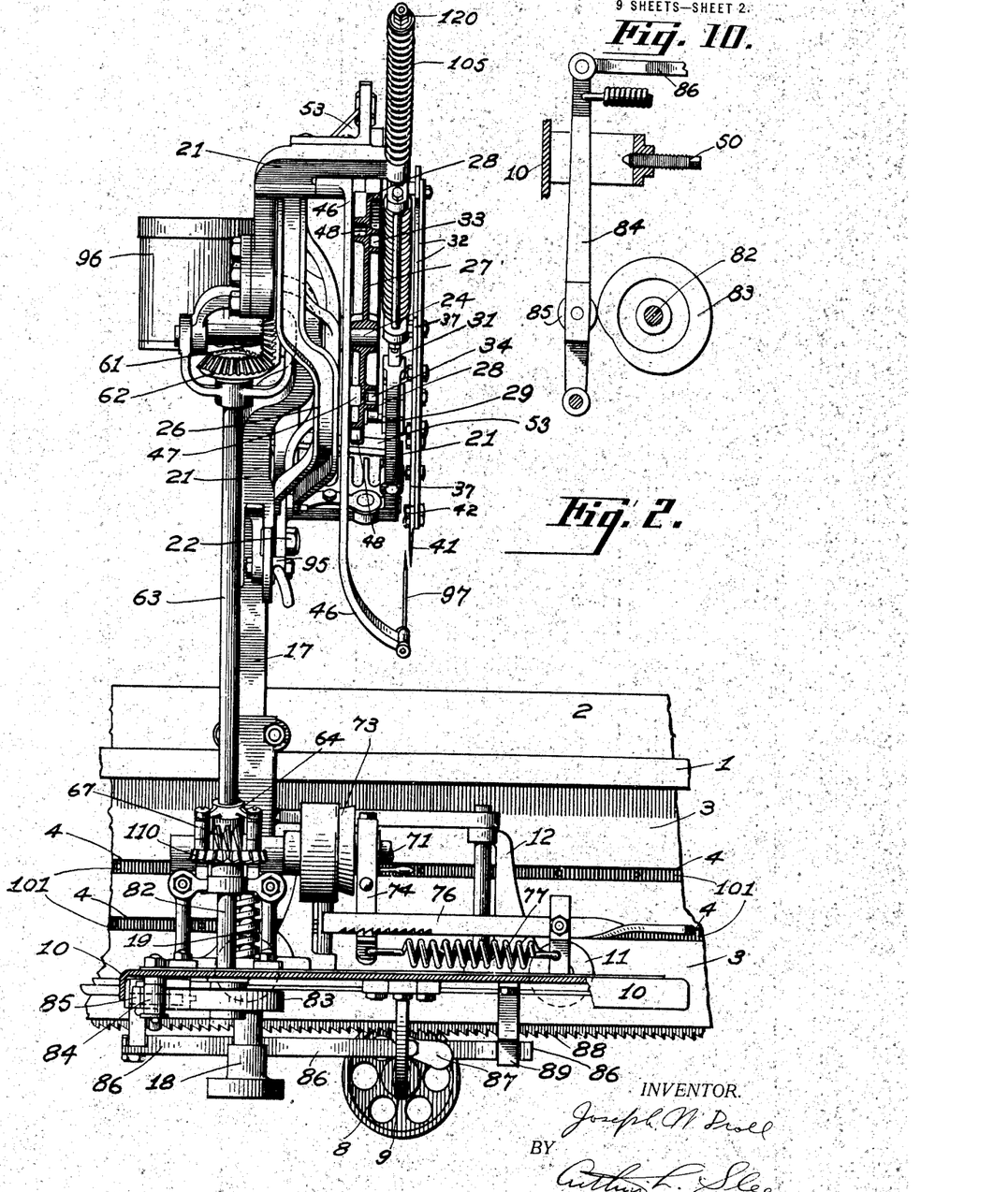
Fig. 2 is an elevation taken at right angles to Fig. 1.
Fig. 10 is a detailed view disclosing the means for regulating the adjustable propelling mechanism.

A sewing needle arm or lever 46 is pivotally mounted at its upper end to the upper extension 21 and is provided with a roller 47 which engages a groove 48 on the rear face of the cam 27, as disclosed in Fig. 2 of the drawings.

Figure 1:
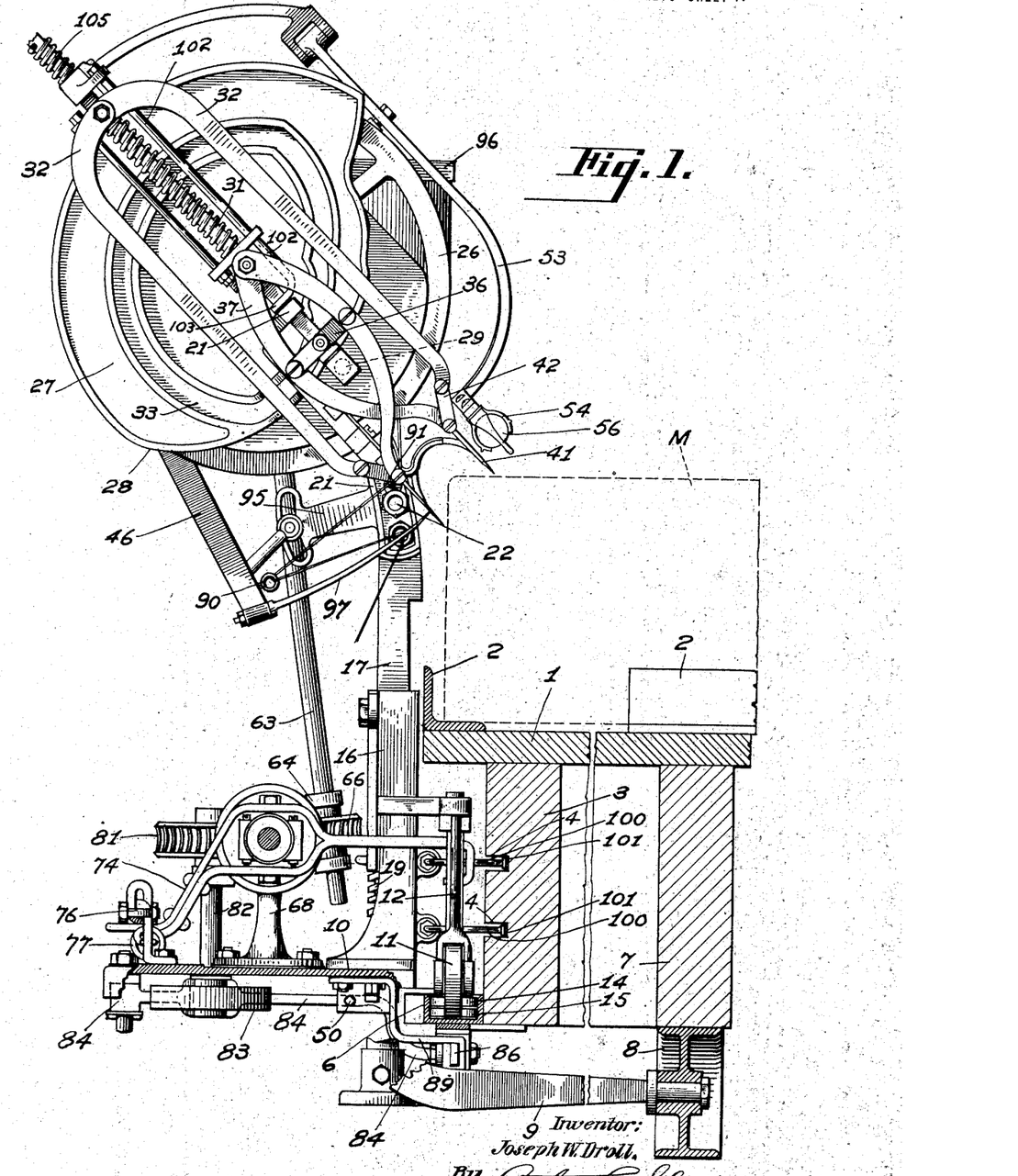
Figure 1 is a transverse sectional view taken through a portion of a mattress roll forming table disclosing my improvement in front elevation attached thereto.

A shuttle arm 53 is pivotally mounted at its upper end to the upper extension 21 and carries at its lower end a shuttle carrier 54 to slidably engage a shuttle 56 as disclosed in Figs. 1 and 7 of the drawings.

The shaft 24 is provided with a bevel gear 61 which meshes with a similar gear 62 on the upper end of a shaft 63 whose lower end is slidably mounted within a yoke 64 pivotally mounted upon a shaft 71 of any suitable motor not shown. A worm gear 66 is feathered to the lower end of the shaft 63 and is driven by a worm 67 on the shaft 71.

As the upper extension 21 is partially rotated on its pivot 22 to adjust the mechanism relatively to the position of the mattress indicated in dotted lines in the several figures it is obvious that the shaft 63 will slide through the worm gear 66.

The shaft 71 is provided with a clutch 73 whereby the operation of the mechanism may be interrupted. The clutch is normally held in engaging relation by an operating lever 74 normally held in position by means of a toothed bar 76. When the lever 74 is released from the bar 76 a spring 77 operates to disengage the clutch 73 by moving the operating lever 74 thereof.

A second worm gear 81 meshes with the worm gear 67 and rotates a shaft 82 extending below the frame 10 and provided with a cam 83 which operates a lever 84, provided with an antifriction roller 85.

A rod 86 has one end pivotally mounted upon the end of the lever 84 and is reciprocated thereby at regular intervals to move the frame 10 and mechanism connected thereto equal distances between stitches and cycles of the machine.

The free end of the rod 86 is slidably mounted within a suitable guide 89 secured to the under side of the frame 10.

The rod 86 is provided with a pair of weighted pawls 87 to engage a rack 88 on the lower side of the track or supporting channel 6 and move the frame 10 when said rod 86 is moved in one direction and to release said rack 88 when moved in the opposite direction by the action of the lever 84 and cam 83.

In order to regulate the distance moved a set screw 50 shown in Fig. 10 of the drawings, is adjusted to regulate the throw of the lever 84 to include only a sufficient number of teeth of the rack 88 to move the frame 10 the required distance.

In adjusting the angle of the mechanism, including the packing needles 41, relatively to the mattress M, which is indicated throughout several views by means of dotted lines, the said mechanism is secured in the required position by means of the clamp indicated in general by the numeral 95.

A receptacle 96 is provided to contain thread for the sewing needle 97 on the lower end of the needle arm or lever 46. The thread passes through an eyelet 90 on the needle arm 46 and also through a second eyelet 91 at or near the pivotal point 22 of the extensions 17 and 21.

By means of this arrangement the thread is tightened or taken up when the arm 46 recedes from the mattress M after having stitched the said mattress M.

Figure 3:
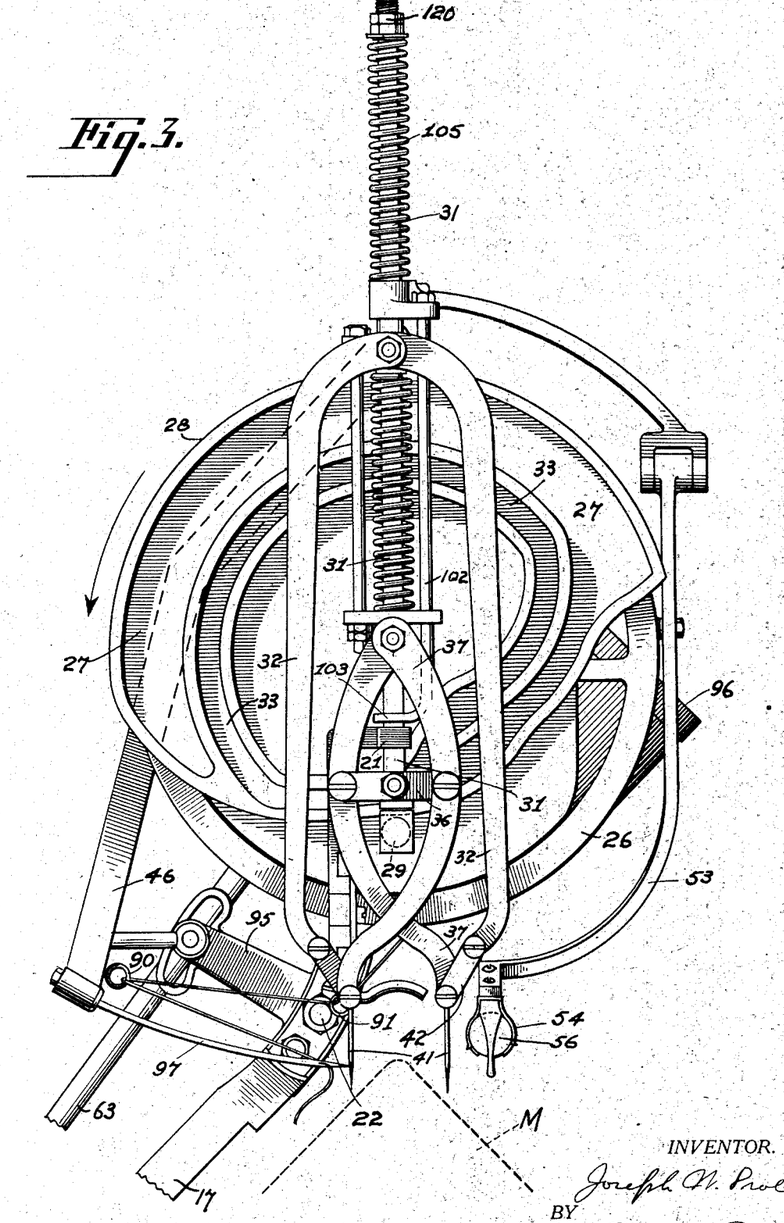
Fig. 3 is an enlarged, broken front elevation of the mechanism arranged vertically to simplify the drawings, disclosing the mechanism in a normal or starting position.

When the needle 97 is in the mattress M the eyelets 90 and 91 are close together so that the thread passes a compartively short distance from one to the other end then through the eye of the needle 97. When the needle 97 is receded the thread is pulled backward or outward with the arm 46 and eyelet 90 thereon thereby taking up the slack in said thread as disclosed in Figs. 1 and 3 of the drawings.

The operation is as follows:

The normal position of the mechanism and parallel packing needles 41 is as disclosed in Figs. 1 and 2 of the drawings.

The motor, not shown, being supplied with energy through the trolleys 100, which are secured to and insulated from the frame 10 and which engage conductors 101 in the grooves 4 of the stringer 3, operates the various gears, worms and cams.

Figure 4:
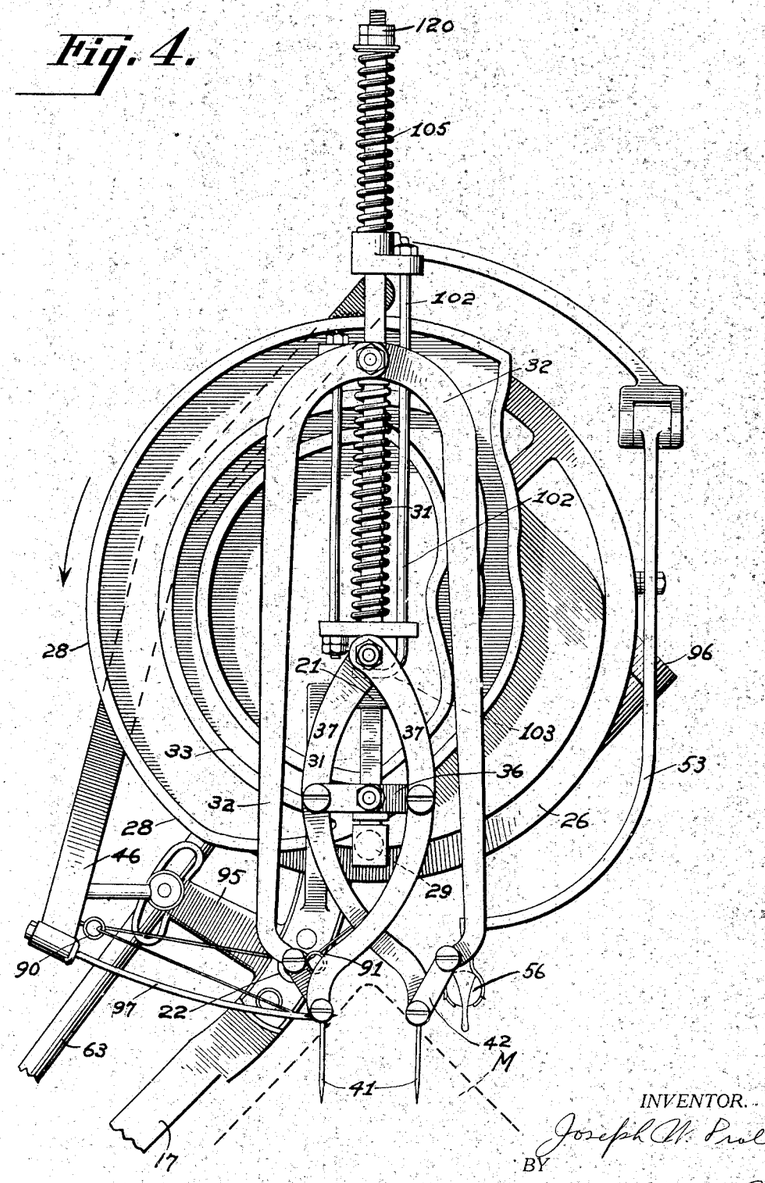
Fig. 4 is a similar view disclosing the needles within the mattress.

The rotation of the cam 27 will cause the groove 33 therein and the face 28 thereof to engage the roller 34 of the links 36 and the roller 29 on the lower end of the square rod 31 respectively, thereby moving the arms 32 and 37 downward and parallel with the longitudinal axis of the shaft or rod 31 to move the parallel packing needles 41 into the mattress M as disclosed in Fig. 4 of the drawings.

Figure 5:
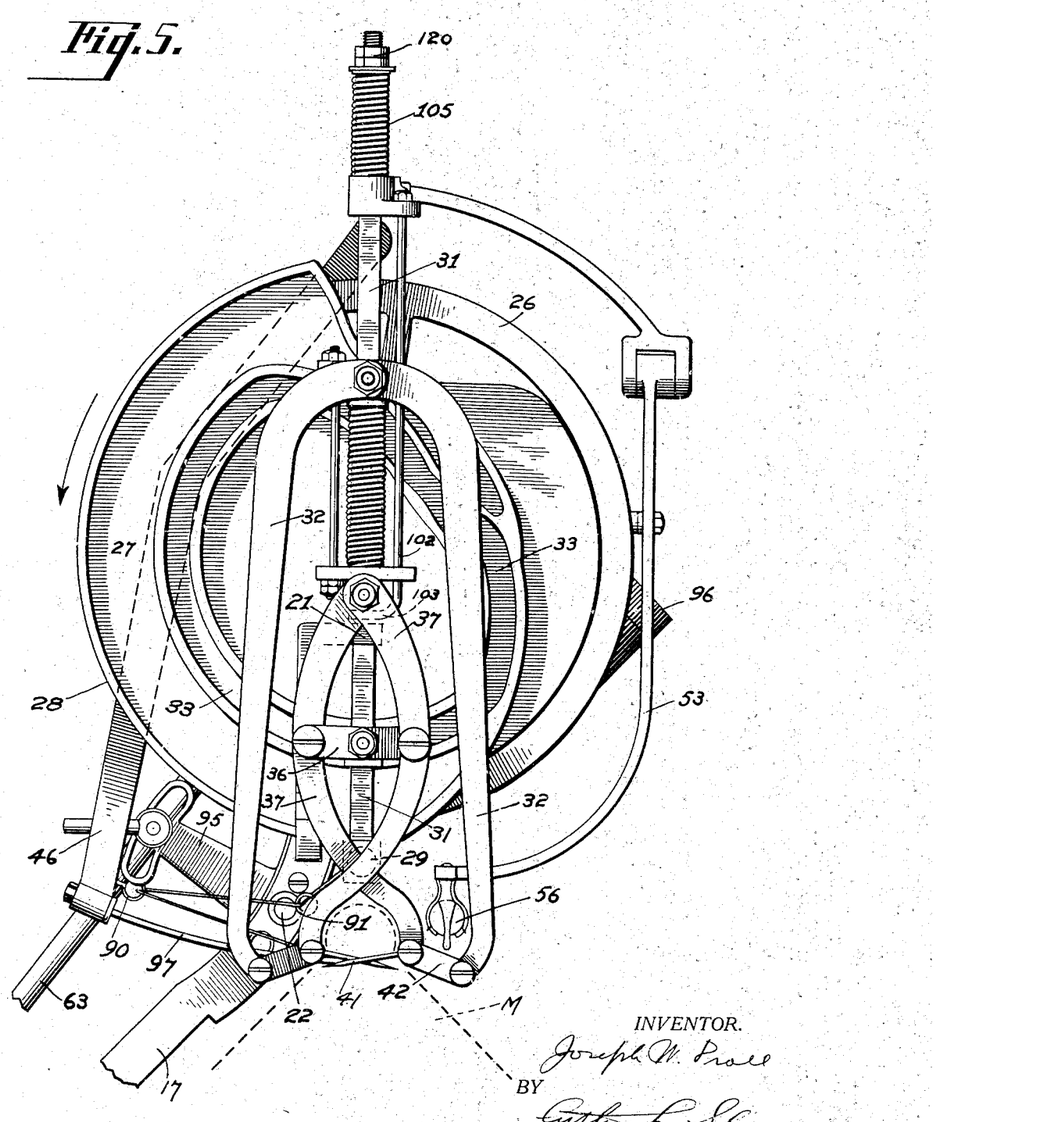
Fig. 5 is a similar view disclosing the needles forming the roll.

From this point on the groove 33 only is concentric to the cam 27 so that a continued rotation of the cam 27 will hold the links 36 in alinement and the arms 37 stationary while the roller 29, actuated by the face 28 of the cam 27 moves the rod 31 downward and also the levers 32 connected thereto which will operate to rotate the packing needles 41 on their pivotal points and into alinement and pack stuffing within the mattress M into the corner of said mattress thereby forming a hard firm and uniformly packed roll, as disclosed in Fig. 5 of the drawings.

A rod 102 has its upper end secured to the top of the upper extension 21 and is provided on its lower end with a lateral extension 103 to engage the sleeve 38 upon which the arms 37 are pivotally mounted thereby preventing the said arms 37 from moving downward while the shaft or square rod 31 is being moved by the action of the face 28 of the cam 27, and illustrated in Figs. 4 and 7 of the drawings.

A spring 105 is interposed on the rod 31 and between the extension 21 and a nut 120 on the top of said rod 31. The sleeve 107 is secured to the rod 31 and when the roller 29 is permitted to recede by the face 28 of the cam 27 the spring 105 acting against the nut 120 returns the arms 32 to normal position.

This spring 105 is also used to retain the roller 29 constantly against the face 28 of the cam 27.

Figure 6:
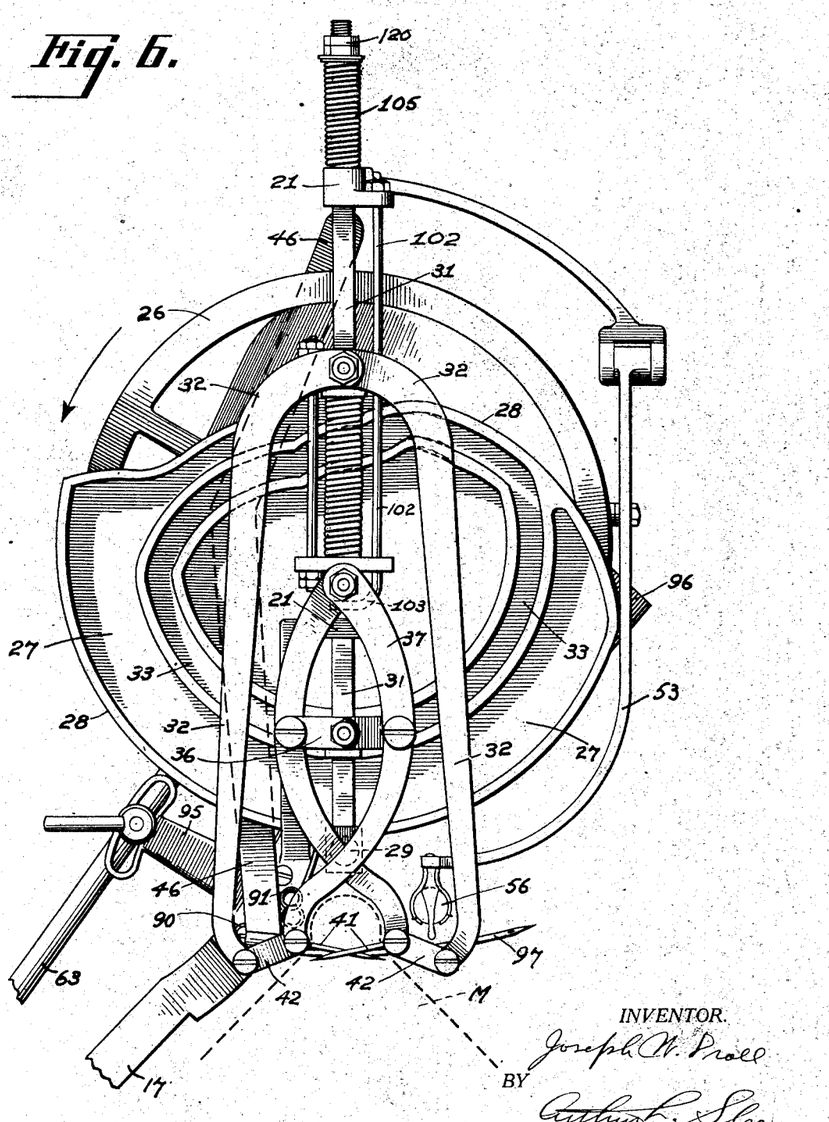
Fig. 6 is a similar view disclosing the sewing needle engaging the formed roll.

A continued rotation of the cam 27 will cause the groove 48 in the rear face thereof to operate the needle arm 46 and move the needle 97 through the mattress M as disclosed in Fig. 6 of the drawings.

After the needle 97 has pulled the thread through the formed roll the groove 48 in the rear face of the cam 27 operates to recede the needle 97 sufficiently to form a loop in the usual manner. At this point the cam 26 operates the shuttle arm 53 to move the shuttle 56 through the loop so formed, said loop readily passing between the shuttle 56 through the loop so formed, said loop readily passing between the shuttle 56 and the resilient shuttle holder 54 on the lower end of the shuttle arm 53.

This position is disclosed in side elevation in Fig. 7 of the drawings, the dotted lines being used to indicate the forward position of the shuttle 56.

Figure 8:
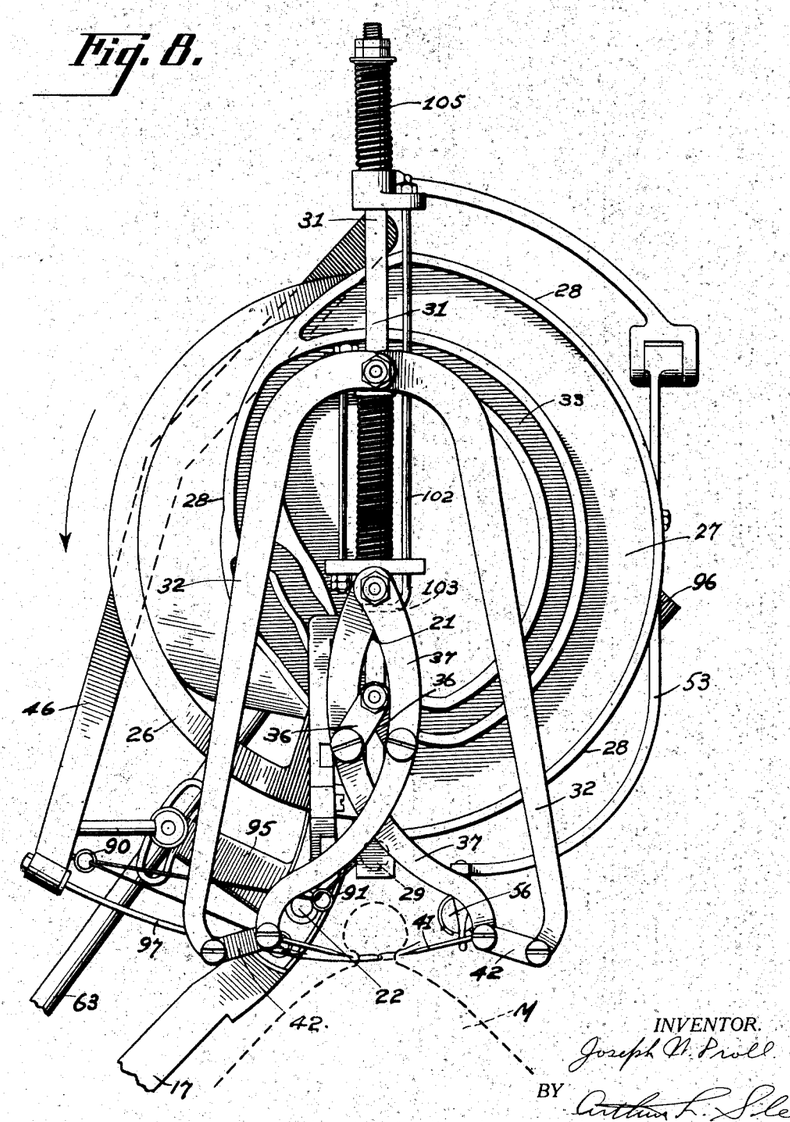
Fig. 8 is a view similar to Fig. 6 disclosing the sewing needle after having formed a stitch and the needles being withdrawn.

The withdrawal of the needle from the formed roll and the return movement of the shuttle arm 53 with its shuttle 56 tends to draw a lock stitch through the formed roll the eyelets 90 and 91 operating to take up the slack in the thread passing through the needle as disclosed in Fig. 8 of the drawings.

After the roll has been formed and permanently secured by the hereinabove described sewing mechanism a drop in the groove 33 of the cam 27 operates to move the pivotal point of the links 36 upward thereby opening the lower ends of the arms 37 to withdraw the needles 41 from the roll along the lines of their longitudinal axes thereby withdrawing said packing needles 41 without affecting the stuffing in the formed roll.

Figure 9:
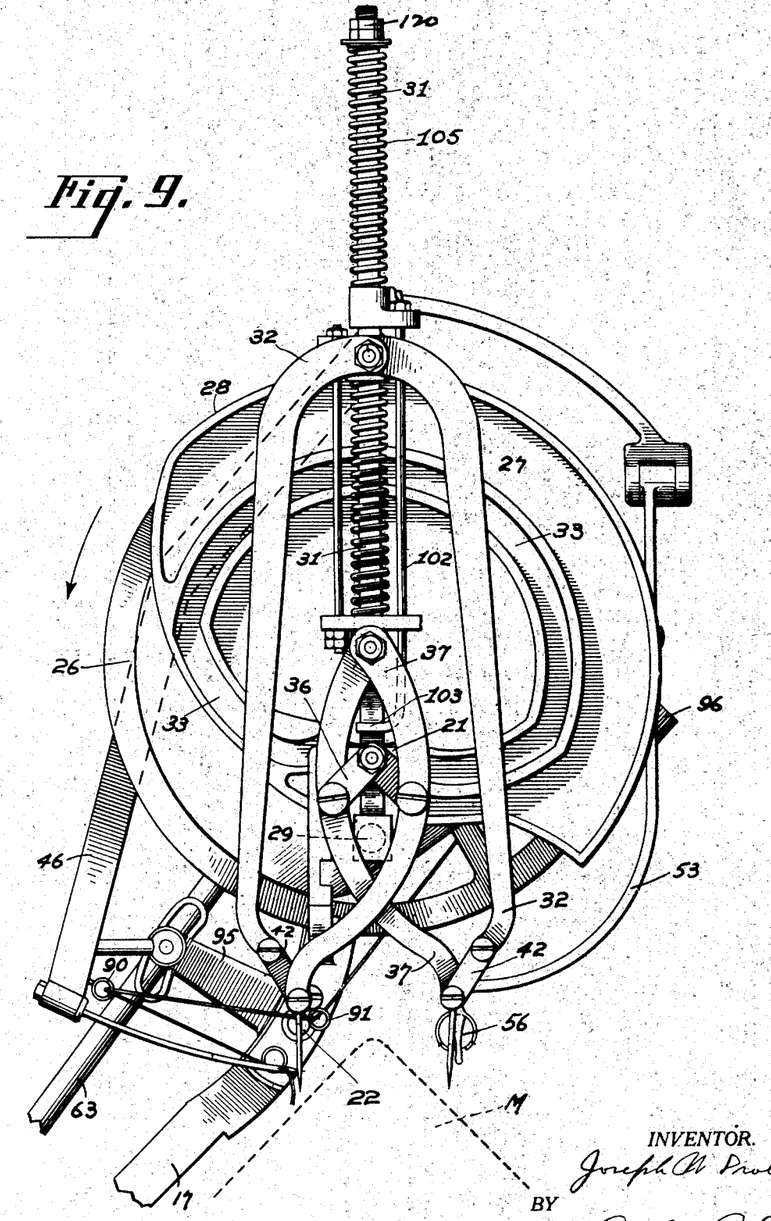
Fig. 9 is a similar view disclosing the position just prior to being returned to normal position.

As soon as the needles 41 have cleared the ticking or mattress M a drop in the face 28 of the cam 27 operates to release the square rod 31 which is then moved upward by the tension of the spring 105. A continued drop of the groove 33 toward the center of the cam causes the links 36, arms 37 and arms 32 to move upward and away from the mattress or the formed roll thereon as disclosed in Fig. 9 of the drawings.

A curved portion of the groove 33 then operates to restore the links 36 to the position indicated in Fig. 1 of the drawings and ready for the next operation.

While the needles 41 are being returned to normal position a worm gear 81 rotates the shaft 82 and cam 83 thereon to operate the lever 84 and the rod 86. The weighted pawls 87 thereon will then engage the toothed bar or ratchet 88 on the lower side of the track 6 and move the frame 10 and all of the mechanism connected thereto a predetermined distance as determined or regulated by the set screw 50 as disclosed in Fig. 10 of the drawings.

The cams then operate the various arms and needles as hereinbefore described to form a continuous roll along the edges of the mattress and to permanently secure said roll by stitching.

When a roll has been formed around the entire upper edge of the mattress M the mattress is turned over and the same operation repeated to form a roll along the other edges of the said mattress M.

It is obvious from the foregoing that I have provided an improved mattress roll forming machine adapted to gather stuffing from a greater area and through a greater angle than has heretofore been accomplished by employing a pair of parallel packing needles and mechanism to force said needles into the side and top of a mattress adjacent the corners thereof and swinging said needles to gather stuffing into the corner of the mattress, thereby forming a hard, uniformly packed roll, as well as means for permanently securing the roll when formed.

It is also obvious that by altering the angle of the needles and operating arms therefore, relatively to the mattress M, that the position of the formed roll upon the mattress may be regulated and adjusted.

The details of construction are so susceptible to variation that I do not wish to confine myself to the precise construction shown herein but rather to avail myself of any modification that may fall properly within the scope of my invention.

Having thus described my invention what I claim as new and desire to secure by Letters Patent is—

1. A mattress roll forming machine comprising a pair of pivotally mounted packing needles; means for moving the needles into the top and side of a mattress adjacent the corner thereof and at an angle to said side and top; means for rotating the needles on their pivotal points to gather stuffing within the mattress into the corner thereof from both sides to form a roll on said corner; and means for sewing the roll so formed.

2. A mattress roll forming machine comprising a pair of pivotally mounted packing needles; means for moving the needles into the top and side of a mattress adjacent the corner thereof and at an angle to said side and top; means for rotating the needles on their pivotal points to gather stuffing within the mattress into the corner thereof from both sides to form a roll on said corner; and means for sewing the roll so formed, means for withdrawing the needles away from each other and from the mattress; and means for returning the needles to a parallel position after having been withdrawn from the mattress.

3. A mattress roll forming machine comprising a pair of pivotally mounted packing needles; means for moving the needles into the top and side of a mattress adjacent the corner thereof and at an angle to said side and top; means for rotating the needles on their pivotal points to gather stuffing within the mattress into the corner thereof from both sides to form a roll on said corner; and means for sewing the roll so formed; means for withdrawing the needles away from each other and from the mattress; and means for returning the needles to a parallel position after having been withdrawn from the mattress; and means for moving the needles along the edge of the mattress between operations.

4. A mattress roll forming machine comprising a pair of pivotally mounted packing needles; means for moving the needles into the top and side of a mattress adjacent the corner thereof and at an angle to said side and top; means for rotating the needles on their pivotal points to gather stuffing within the mattress into the corner thereof from both sides to form a roll on said corner; and means for sewing the roll so formed; means for withdrawing the needles away from each other and from the mattress; and means for returning the needles to a parallel position after having been withdrawn from the mattress; and means for moving the needles along the mattress equal distances at regular intervals.

5. A mattress roll forming machine comprising a pair of pivotally mounted packing needles; means for moving the needles into the top and side of a mattress adjacent the corner thereof and at an angle to said side and top; means for rotating the needles on their pivotal points to gather stuffing within the mattress into the corner thereof from both sides to form a roll on said corner; and means for sewing the roll so formed; means for withdrawing the needles away from each other and from the mattress; and means for returning the needles to a parallel position after having been withdrawn from the mattress; and means for moving the needles along the mattress equal distances at regular intervals; and means for regulating the needle moving means to alter the length of the distances moved.

6. A mattress roll forming machine comprising a pair of parallel pivotally mounted packing needles; means for moving the needles into the top and one side of a mattress and adjacent the edge thereof and at an angle to said side and top of the mattress; means for partially rotating the needles on their pivotal points after entering the mattress to substantially aline said needles, thereby gathering stuffing within the mattress and packing same into the corner thereof to form a roll; sewing means to secure the roll so formed; and means for withdrawing the needles while in alined position to prevent the stuffing from being removed from the formed roll.

7. A mattress roll forming machine comprising a pair of parallel pivotally mounted packing needles; means for moving the needles into the top and one side of a mattress and adjacent the edge thereof and at an angle to said side and top; means for altering the angle of the needles to the side and top of the mattress; means for partially rotating the needles on their pivotal points after entering the mattress to substantially aline said needles thereby gathering stuffing within the mattress and packing same into the corner thereof to form a roll; sewing means to secure the roll so formed; and means for withdrawing the needles while in alined position to prevent the stuffing from being removed from the formed roll; and means for returning the needles to normal position away from the formed roll.

8. A mattress roll forming machine comprising a pair of parallel pivotally mounted packing needles; means for moving the needles into the top and one side of a mattress and adjacent the edge thereof and at an angle to said side and top; means for altering the angle of the needles to the side and top of the mattress; means for partially rotating the needles on their pivotal points after entering the mattress to substantially aline said needles thereby gathering stuffing within the mattress and packing same into the corner thereof to form a roll; sewing means to secure the roll so formed; and means for withdrawing the needles while in alined position to prevent the stuffing from the formed roll; and means for returning the needles to normal position away from the formed roll; and means for moving the needles equal distances at regular intervals along the edge of the mattress while the sewing means is disengaged therefrom.

9. A mattress roll forming machine comprising a pair of parallel pivotally mounted packing needles; means for moving the needles into the top and one side of a mattress and adjacent the edge thereof and at an angle to said side and top; means for altering the angle of the needles to the side and top of the mattress; means for partially rotating the needles on their pivotal points after entering the mattress to substantially aline said needles thereby gathering stuffing within the mattress and packing same into the corner thereof to form a roll; sewing means to secure the roll so formed; and means for withdrawing the needles while in alined position to prevent the stuffing from being removed from the formed roll; and means for returning the needles to normal position away from the formed roll; and means for moving the needles equal distances at regular intervals along the edge of the mattress while the sewing means is disengaged therefrom; and means for altering the distances moved at regular intervals.

10. The combination with a mattress roll forming machine of a table to support a mattress; a frame mounted to traverse the side of the table; a pair of arms pivotally and slidably mounted upon the frame and arranged at an angle to one edge of the mattress and in a vertical plane; a pair of parallel packing needles pivotally mounted upon the lower ends of the arms to engage the top and one side of the mattress adjacent the edge thereof; means for moving the arms and needles thereon into the mattress; means for rotating the needles toward and in alinement with each other within the mattress to gather and pack stuffing into the corner thereof to form a roll; sewing means to secure the roll permanently; and means for spreading the arms to withdraw the needles from the mattress while alined to prevent stuffing from being withdrawn from the roll.

11. The combination with a mattress roll forming machine of a table to support a mattress; a frame mounted to traverse the side of the table; a pair of arms pivotally and slidably mounted upon the frame and arranged at an angle to one edge of the mattress and in a vertical plane; a pair of parallel packing needles pivotally mounted upon the lower ends of the arms to engage the top and one side of the mattress adjacent the edge thereof; means for moving the arms and needles thereon into the mattress; means for rotating the needles toward and in alinement with each other within the mattress to gather and pack stuffing into the corner thereof to form a roll; sewing means to secure the roll permanently; and means for spreading the arms to withdraw the needles from the mattress while alined to prevent stuffing from being withdrawn from the roll; and means for returning the needles to normal position after being withdrawn from the mattress.

12. The combination with a mattress roll forming machine of a table to support a mattress; a frame mounted to traverse the side of the table; a pair of arms pivotally and slidably mounted upon the frame and arranged at an angle to one edge of the mattress and in a vertical plane; a pair of parallel packing needles pivotally mounted upon the lower ends of the arms to engage the top and one side of the mattress adjacent the edge thereof; means for moving the arms and needles thereon into the mattress; means for rotating the needles toward and in alinement with each other within the mattress to gather and pack stuffing into the corner thereof to form a roll; sewing means to secure the roll permanently; and means for spreading the arms to withdraw the needles from the mattress while alined to prevent stuffing from being withdrawn from the roll; and means for returning the needles to normal position after being withdrawn from the mattress; and means for moving the frame along the edge of the table equal distances at regular intervals.

13. The combination with a mattress roll forming machine of a table to support a mattress; a frame mounted to traverse the side of the table; a pair of arms pivotally and slidably mounted upon the frame and arranged at an angle to one edge of the mattress and in a vertical plane; a pair of parallel packing needles pivotally mounted upon the lower ends of the arms to engage the top and one side of the mattress adjacent the edge thereof; means for moving the arms and needles thereon into the mattress; means for rotating the needles toward and in alinement with each other within the mattress to gather and pack stuffing into the corner thereof to form a roll; sewing means to secure the roll permanently; and means for spreading the arms to withdraw the needles from the mattress while alined to prevent stuffing from being withdrawn from the roll; and means for returning the needles to normal position after being withdrawn from the mattress; and means for moving the frame along the edge of the table equal distances at regular intervals; and means for regulating the distance moved.

14. The combination with a mattress roll forming machine of a table to support a mattress; a frame mounted to traverse the side of the table; a pair of arms pivotally and slidably mounted upon the frame and arranged at an angle to one edge of the mattress and in a vertical plane; a pair of parallel packing needles pivotally mounted upon the lower ends of the arms to engage the top and one side of the mattress adjacent the edge thereof; means for moving the arms and needles thereon into the mattress; means for rotating the needles toward and in alinement with each other within the mattress to gather and pack stuffing into the corner thereof to form a roll; sewing means to secure the roll permanently; and means for spreading the arms to withdraw the needles from the mattress while alined to prevent stuffing from being withdrawn from the roll; and means for returning the needles to normal position after being withdrawn from the mattress; and means for moving the frame along the edge of the table equal distances at regular intervals; and means for regulating the distance moved; and means for altering the angle of the arms and needles relatively to the frame to regulate the position of the roll on the mattress.

In witness whereof I hereunto set my signature.

JOSEPH W. DROLL.